Nov. 13, 1962  C. M. WESTBROOK  3,063,683
MIXING APPARATUS
Filed July 22, 1959                    2 Sheets-Sheet 1
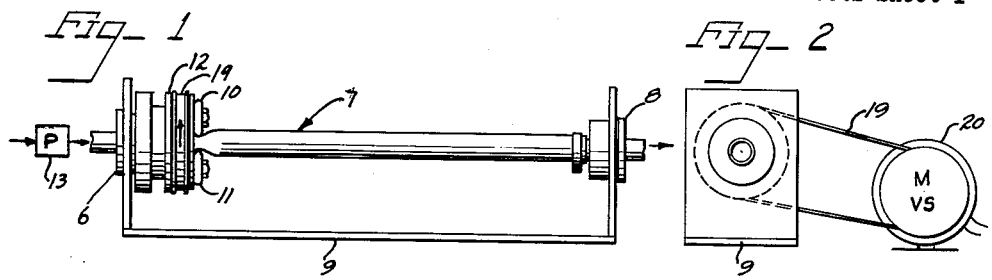
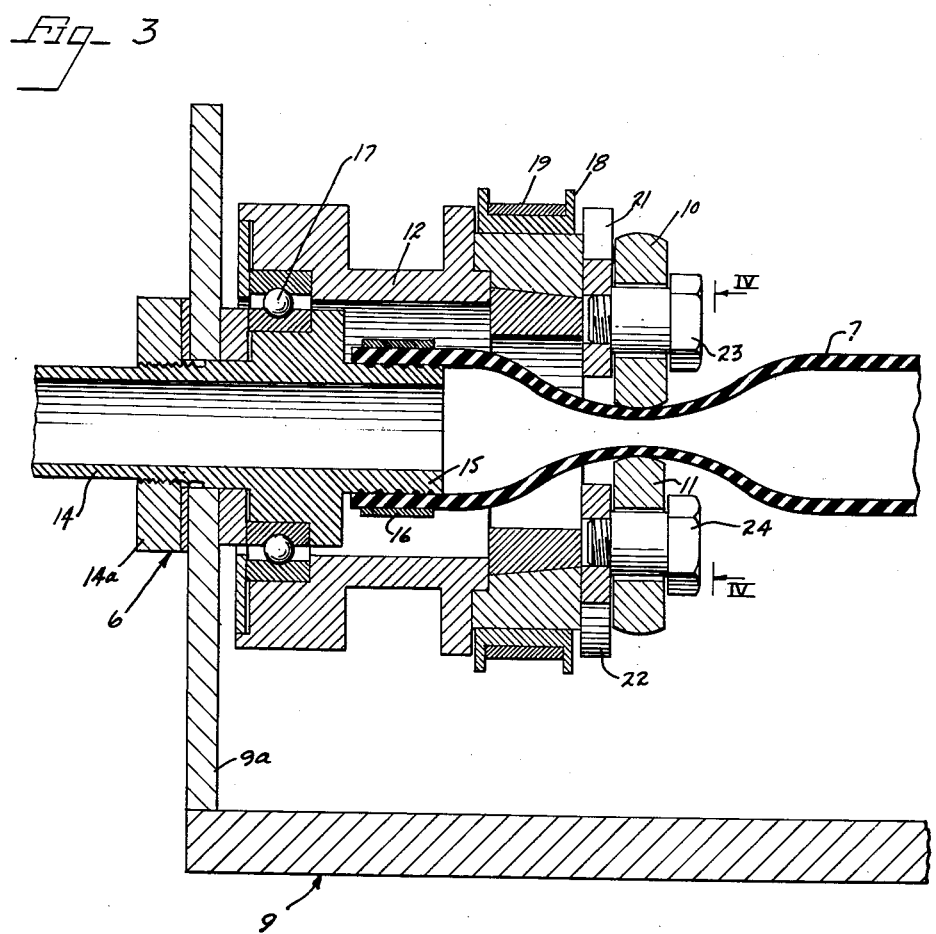
Inventor
CARL M. WESTBROOK Nov. 13, 1962   C. M. WESTBROOK   3,063,683
MIXING APPARATUS
Filed July 22, 1959                    2 Sheets-Sheet 2

Inventor
CARL M. WESTBROOK

United States Patent Office 3,063,683
Patented Nov. 13, 1962

3,063,683
MIXING APPARATUS
Carl M. Westbrook, Beloit, Wis., assignor to Beloit Iron Works, Beloit, Wis., a corporation of Wisconsin
Filed July 22, 1959, Ser. No. 828,880
4 Claims. (Cl. 259—2)

The present invention relates to improvements in mixing apparatus and in particular to an apparatus which is capable of mixing material while it is transferred through a conduit.

The invention contemplates the provision of a flexible wall member such as an elongated section of flexible tubing which defines a channel for conducting a material from an inlet to an outlet. A plurality of pressing means in the form of rollers are supported on a carrier which is driven in rotation coaxial with the tube so that the rollers are rotated around the tube and progressively deform the tube wall. The carrier has adjustable arms which support the rollers for adjustment of the amount the tube is depressed and for moving the rollers radially outwardly away from the tube for cleaning.

An object of the invention is to provide an improved mixing apparatus of the above character which is reliable in its operation, provides an improved mixing operation, is inexpensive to construct, and can be simply inserted in any pipe line for mixing the material conducted therethrough.

Another object of the invention is to provide an improved mixing apparatus which will provide extremely high shear rates operating on any material which can be moved through a short channel and which can mix, blend, knead, or agitate a single material or a plurality of materials.

Another object of the invention is to provide an improved mixing apparatus for a continuous mixing operation which is completely closed against the entry of any foreign materials or air, is non-sparking and may be used for mixing substantially any fluid substance.

An object of the invention is to provide an improved mixing and blending apparatus which is well adapted to use for mixing paper making stocks and coating material and which also may be used in other industries such as for food processing or explosive handling.

Other objects and advantages will become more apparent with the teaching of the principles of the invention in connection with the disclosure of the preferred embodiments thereof in the specification, claims and drawings, in which:

FIGURE 1 is a side elevational view of an apparatus embodying the principles of the present invention;

FIGURE 2 is an end elevational view of the mechanism of FIGURE 1;

FIGURE 3 is an enlarged detailed vertical sectional view taken through the head end of the mixing apparatus;

As shown on the drawings:

Figure 4:
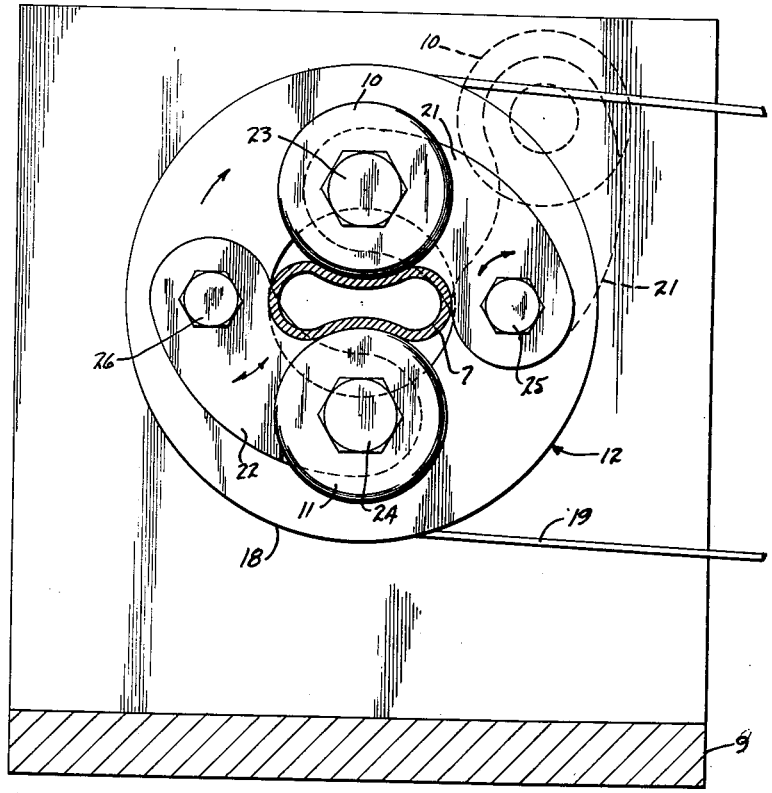
FIGURE 4 is a vertical sectional view taken substantially along line IV—IV of FIGURE 3.

As illustrated in FIGURES 1 and 2, the mixing apparatus shown, which embodies the preferred principles of the invention, has a head 6 to which an elongated flexible wall member in the form of a cylindrical tube 7 is attached at its inlet end. The tube is attached at its outlet end to a support member 8, and the head 6 and support member 8 are mounted on a frame 9. Mixing is accomplished by a pair of pressing means in the form of diametrically opposed rollers 10 and 11 supported on a rotatable carrier 12. The material to be mixed is supplied to the head from a source 13, which may be a pump or the like for forcing fluid along at a continuous rate in the direction indicated by the arrows adjacent the pump, in FIGURE 1.

As shown in greater detail in FIGURES 3 and 4, the head 6 includes an elongated connector sleeve 14 which is threaded to receive a nut 14a for securing it to an upright frame portion 9a which is part of the main frame 9. The connector sleeve has an annular connecting portion 15 which is roughened at its outer surface for gripping the end of the tube 7. The tube is clamped to the roughened surface by clamping member 16.

The head 6 is provided with a ball bearing assembly 17 for rotatably supporting the carrier 12 for rotation coaxially with the tube 7. The carrier is driven in rotation by a pulley 18 mounted thereon driven by a belt 19 which in turn is driven by a variable speed motor 20. The carrier 12 is driven at selectively controllable speeds through appropriate mechanism for controlling the mixing action, and the speed may be regulated by the variable speed output motor as shown at 20 or by a speed control mechanism mounted on the carrier, as will be appreciated by those skilled in the art.

The rollers 10 and 11 are supported on the carrier on arms 21 and 22 and are rotatable about axes parallel to the axis of the tube 7. Bearing studs 23 and 24 are threaded into the ends of the arms 21, 22 and rotatably support the rollers 10 and 11 thereon. The rollers are formed with a crowned or slightly rounded outer surface for the mixing action and to prevent damaging the tube 7.

The arms 21 and 22, as illustrated in FIGURE 4, are mounted so that the rollers 10 and 11 may be adjustably positioned in different radial mixing positions. The arms 21 and 22 respectively are adjustably secured to the carrier 12 by studs 25 and 26 which may be tightened with the rollers in their adjusted secured positions or which may be loosened, to swing the rollers radially outwardly. The arms also permit the rollers to be swung out to a position for cleaning the tube 7, and this position is shown by the roller 10 in the dotted line position of FIGURE 4. As will be appreciated by those skilled in the art the various arrangements may be employed for controllably adjusting the radial position of the rollers and for example, arms with radially extending elongated slots and with fastening bolts extending through the slots may be provided.

FIGURE 4 illustrates the effect of the rollers 10 and 11 on the tube 7 as they are rotated in an annular path about the tube.

The tube 7 forms a channel member for conducting a material which is continually flowing through the tube. The tube is formed of a material such as rubber which is inert to the material being mixed therein and is essentially flexible and may be resilient or elastic in character.

Figure 5:
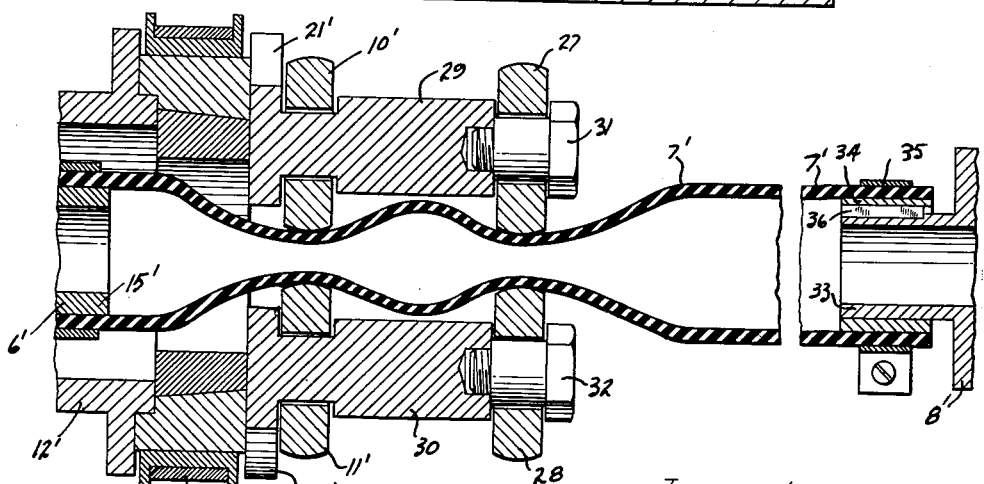
FIGURE 5 is a vertical sectional view, similar to FIGURE 3, but illustrating a modified form of the invention.

In the arrangement illustrated in FIGURE 5, which shows a modified form of the mixing apparatus, parts which are similar to the embodiments of FIGURES 1 through 4 are identified by similar numerals with a prime suffix. The channel member or tube 7' is clamped to an annular end 15' of the head 6'. A carrier 12' supports a pulley 18' which is driven in rotation by a belt 19'. Mounted on the carrier arms 21' and 22', which have axially extending journals 29 and 30, are the rollers 10' and 11'. The journals extend along axes parallel to the axis of the tube 7' and carry additional rollers 27 and 28 at their ends which are mounted on journal studs 31 and 32. The sets of rollers compress the tube 7' at axially spaced locations to perform a dual mixing action. In some instances it will be desirable to offset the second set of rollers 27 and 28 from the first set 10' and 11' by 90°.

FIGURE 5 also illustrates an arrangement for supporting the outlet end of the tube 7' and the support may also be used with the mechanism of FIGURE 3. The support 8' has an annular hub 33 into which the material leaving the tube 7' flows. Mounted on the hub 33 is an axially slidable collar 34 to which the outlet end of the tube 7' is clamped by clamping member 35. The collar 34 is non-rotatably mounted on the hub 33 and rotation is prevented by means such as a key 36. This arrangement provides for free axial expansion of the tube 7' and prevents twisting of the delivery end. It will be recognized that with varying deflection of the tube by the rollers of the embodiment of FIGURE 3, or of the embodiment of FIGURE 5, the length of the tube will change and this is accommodated by the end connection arrangement illustrated in FIGURE 5.

In operation, a material to be mixed is delivered to the head 6, FIGURE 1, by a supply source such as the pump 13 and the carrier 12 is rotatably driven by the motor 20 at a speed which is selected in accordance with the material to be mixed. The rollers 10 and 11 are rotatably carried on the carrier 12 in an annular path progressively deforming the wall of the tube 7 as they rotate to mix the material within the tube. The amount which the wall is deflected is adjusted by adjusting the pivotal position of the arms 21 and 22 carrying the rollers 10 and 11, and the arms can be swung completely outwardly for cleaning the tube.

The mixing time and effectiveness can be controlled by regulating the speed of rotation of the carrier and mixing can also be controlled by adjustment of the rate of delivery through the tube. Mixing time may also be controlled by recycling the material or by the addition of units in tandem.

Thus it will be seen that I have provided an improved mixing apparatus which meets the objectives and advantages hereinbefore set forth. The mechanism is well suited to use in blending paper making stock and coating materials and is also useful in food processing and handling explosives. It is also adaptable to simple connection in conveyor lines handling air-borne or water-borne materials such as grain, starch, powdered coal and the like which tend to settle out of the carrier stream. Additional rollers or pressing means may be provided in the same plane as the rollers shown in FIGURE 3 or in additional planes such as illustrated in FIGURE 5. The mixing apparatus provides extremely high shear rates and may operate on any material which can be moved through a short channel. The apparatus can be used for mixing, blending, kneading and agitating processes. It is inherently non-sparking and can be used on almost any fluid material which will not attack the flexible material of the tube. The mixing process is completely enclosed for protection against the entry of foreign materials and materials mixed or protection from the air.

The drawings and specification present a detailed disclosure of the preferred embodiments of the invention, and it is to be understood that the invention is not limited to the specific forms disclosed, but covers all modifications, changes and alternative constructions and methods falling within the scope of the principles taught by the invention.

I claim as my invention:

1. A mixing apparatus comprising a flexible wall member defining a linear tubular channel with an inlet and an outlet for conducting material to be mixed therethrough, a plurality of pressing means for progressively deforming said wall member, carrier means for supporting said pressing means and guiding them in a wall deforming path encircling the linear channel for repeated movement around the channel, and drive means for driving said carrier means.

2. A mixing apparatus comprising in combination a flexible wall member defining an elongated channel with an inlet and an outlet for conducting the materials to be mixed therethrough, a plurality of pressing means for progressively deforming said wall member, carrier means for supporting said pressing means and guiding them in an encircling wall deforming path circumferentially around the outside of said channel to deform the flexible wall member, means for forcing a continuous flow of material to be mixed through said channel from the inlet to the outlet, and drive means for driving said carrier means in rotation.

3. A mixing apparatus comprising an elongated axially extending tubular shaped channel member having an inlet and an outlet and being flexible in character, a first roller rotatable about an axis parallel to the axis of said channel member, a first roller journal mounted for rotation coaxial with the axis of said channel member, a second roller rotatable about an axis parallel to the axis of said channel member and spaced axially from the first roller, a second roller journal mounted for rotation coaxial with the axis of said channel member, said first and second roller journals supporting said first and second rollers in deforming engagement with said channel member, and means for driving said roller journals in rotation.

4. A mixing apparatus comprising in combination a stationary head, an elongated flexible tube attached to said head, means defining an inlet through said head communicating with said tube, a carrier rotatably mounted on said head, a pair of rollers mounted on said carrier and positioned diametrically opposed to each other with respect to the axis of the tube, means supporting said rollers on said carrier in a mixing position wherein the tube is deformed by the rollers with rotation of the carrier and the rollers move around the outer surface of the tube encircling the tube about its linear axis, and a tubular shaped fixed outlet conduit connected to the outlet end of said tube and in relatively axially slidable telescopic relationship with said outlet end of the tube, said conduit being free of axially restricting attachment to said tube so that the outlet end of the tube may shift axially relative to said fixed outlet conduit as the tube is deformed radially by the rollers.

References Cited in the file of this patent

UNITED STATES PATENTS

| | | |
|---|---|---|
| 939,017 | Hallenberg | Nov. 2, 1906 |
| 2,015,123 | Pennell | Sept. 24, 1935 |
| 2,107,851 | Boehm | Feb. 8, 1938 |
| 2,578,505 | Carlin | Dec. 11, 1951 |
| 2,695,117 | Daniels | Nov. 23, 1954 |
| 2,696,173 | Jensen | Dec. 7, 1954 |
| 2,915,983 | Berman | Dec. 8, 1959 |